United States Patent
Zimmermann et al.

(10) Patent No.: US 7,831,065 B2
(45) Date of Patent: Nov. 9, 2010

(54) METHOD FOR MOTION ESTIMATION

(75) Inventors: Klaus Zimmermann, Deizisau (DE); Muhammad Siddiqui, Stuttgart (DE)

(73) Assignee: Sony Deutschland GmbH, Cologne (DE)

( * ) Notice: Subject to any disclaimer, the term of this patent is extended or adjusted under 35 U.S.C. 154(b) by 1358 days.

(21) Appl. No.: 11/249,972

(22) Filed: Oct. 13, 2005

(65) Prior Publication Data
US 2006/0083407 A1    Apr. 20, 2006

(30) Foreign Application Priority Data
Oct. 15, 2004    (EP)    ................... 04024615

(51) Int. Cl.
  *G06K 9/00*    (2006.01)
  *H04L 5/12*    (2006.01)
(52) U.S. Cl. .............. 382/107; 382/103; 382/128; 382/286; 375/362; 375/371
(58) Field of Classification Search ......... 382/103, 382/107, 128, 248, 276, 286–289; 375/362–371
See application file for complete search history.

(56) References Cited

U.S. PATENT DOCUMENTS 6,295,367 B1 * 9/2001 Crabtree et al. ............. 382/103
7,187,810 B2 * 3/2007 Clune et al. ................. 382/294

OTHER PUBLICATIONS

Ertürk S: "Translation, Rotation and Scale Stabilisation of Image Sequences" Electronics Letters, IEE Stevenage, GB, vol. 39, No. 17, Aug. 21, 2003, pp. 1245-1246, XP006020891.

Srinivasa Reddy B et al: "An FFT-Based Technique for Translation, Rotation, and Scale-Invariant Image Registration" IEEE Transactions on Image Processing, IEEE Inc. New York, US, vol. 5, No. 8, Aug. 1, 1996, pp. 1266-1271, XP000595725.

Kuglin C D et al: "The Phase Correlation Image Alignment Method" Proceedings of the 1975 International Conference on Cybernetics and Society IEEE New York, NY, USA, 1975, pp. 163-165, XP000828000.

Pearson J J et al: "Video-Rate Image Correlation Processor" Proceedings of the Society of Photo-Optical Instrumentation Engineers, vol. 119. Applications of Digital Image Processing Soc. Photo-Optical Instrumentation Engrs Bellingham, WA, USA, 1977, pp. 197-205, XP009043064.

Television Motion Measurement For DATV and Other Applications, by G. A. Thomas, B.A. (Hons), A.M.I.E.E., BBC, Research Department Report, Sep. 1987, Research Department, Engineering Division, The British Broadcasting Corporation.

On the Estimation of Global Motion Using Phase Correlation For Broadcast Applications, by Hill, et al., University of Surrey, UK, Image Processing and its Applications, Conference Publication No. 465 @ IEE 1999.

Digital Image Stabilization with Sub-Image Phase Correlation Based Global Motion Estimation, by S. Ertürk, Member IEEE, IEEE Transactions on Consumer Electronics, vol. 49, No. 4, Nov. 2003.

* cited by examiner

*Primary Examiner*—Manav Seth
(74) *Attorney, Agent, or Firm*—Oblon, Spivak, McClelland, Maier & Neustadt, L.L.P.

(57) ABSTRACT

A method for motion estimation of sequences of images is proposed, wherein for consecutive frames (f1, f2) respective corresponding consecutive Fourier transformed frames (F1, F2) are determined, and wherein motion parameters for translation, rotation and/or for scaling are derived based on a phase relationship between said respective corresponding consecutive Fourier transformed frames (F1, F2), and in particular based on translational, rotational and/or scaling properties of the Fourier transforming process.

18 Claims, 9 Drawing Sheets

Figure 1:
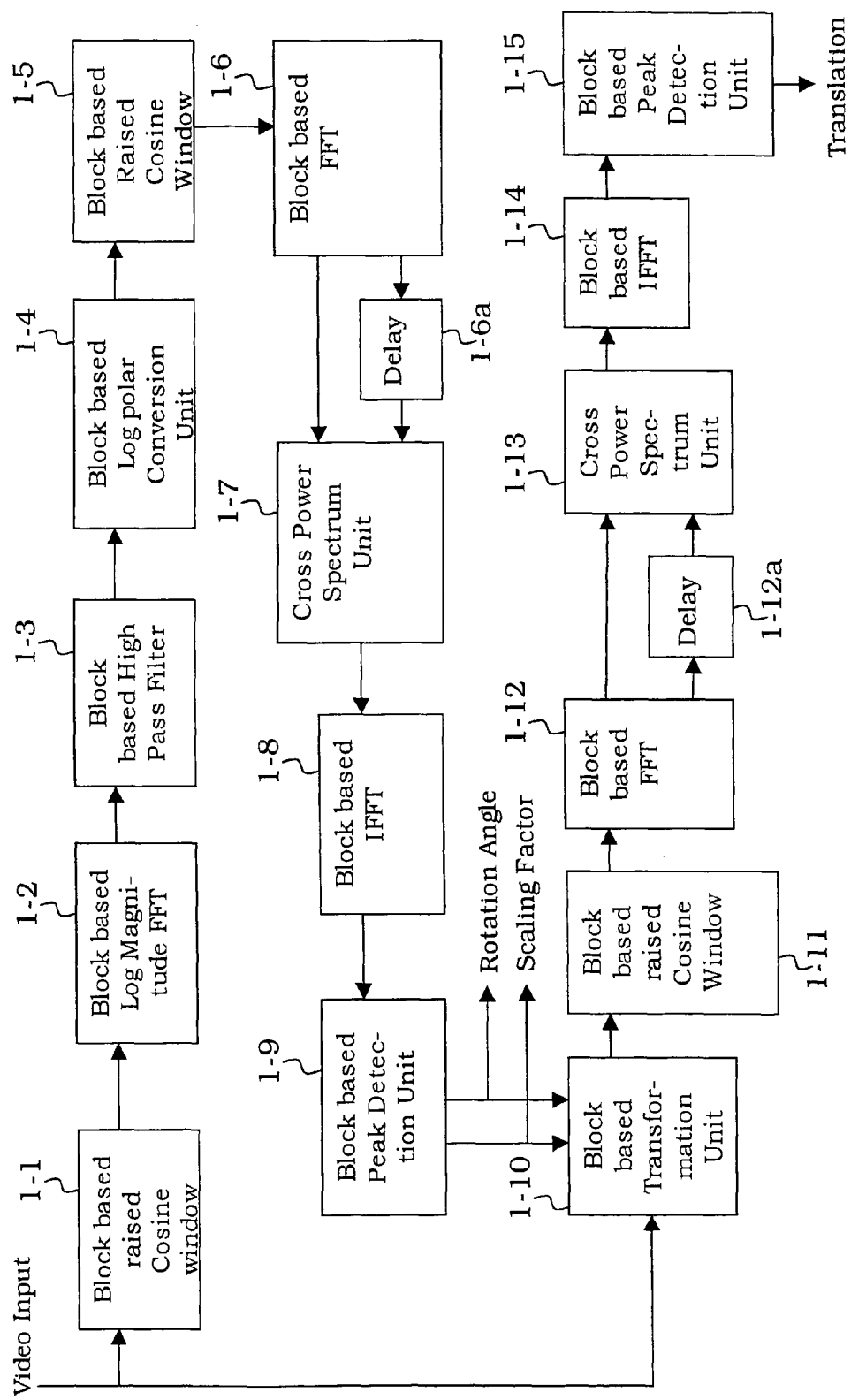

| Parameter | Actual value | Estimated value | Peak value |
|---|---|---|---|
| Translation | 21 | 21 | Peak.Rot.Scl. = 0.0991481 |
| Rotation | 17.2° | 17° | |
| Scale | 1.25 | 1.24489 | Peak.Transl. = 0.26677 |

Tab. 1: Estimation of motion between Fig. 2 (current frame) and Fig. 3 (previous frame)

Fig. 7

| Parameter | Actual value | Estimated value | Peak value |
|---|---|---|---|
| Translation | 5 | 5 | Peak.Rot.Scl. = 0.11419 |
| Rotation | 17.2° | 17° | |
| Scale | 1.65 | 1.63698 | Peak.Transl. = 0.663498 |

Tab. 2: Estimation of motion between Fig. 2 (current frame) and Fig. 4 (previous frame)

Fig. 8

| Parameter | Actual value | Estimated value | Peak value |
|---|---|---|---|
| Translation | 5 | 5 | Peak.Rot.Scl. = 0.145558 |
| Rotation | 90° | 90° | |
| Scale | 1.1 | 1.11575 | Peak.Transl. = 0.705296 |

Tab. 3: Estimation of motion between Fig. 2 (current frame) and Fig. 5 (previous frame)

Fig. 9

| Parameter | Actual value | Estimated value | Peak value |
|---|---|---|---|
| Translation | 21 | 21 | Peak.Rot.Scl. = 0.127022 |
| Rotation | 28.6° | 28.4° | |
| Scale | 1.6 | 1.63698 | Peak.Transl. = 0.15742 |

Tab. 4: Estimation of motion between Fig. 2 (current frame) and Fig. 6 (previous frame)

Fig. 10

| Parameter | Actual value | | Estimated value | | Peak value | | | |
|---|---|---|---|---|---|---|---|---|
| | Global | Local | Global | Local | Global | | Local | |
| | | | | | RotScl | Transl | RotScl | Transl |
| Translation | 1 | 2 | 1 | 2 | 0.2007 | 0.5542 | 0.3982 | 0.5078 |
| Rotation | -16.87° | 11.46° | -16.85° | 11.25° | | | | |
| Scale | 1.103 | 1.1 | 1.103 | 1.093 | | | | |

Tab. 5: Estimation of motion between Fig. 12 (current frame) and Fig. 13 (previous frame)

Fig. 15

| Parameter | Actual value | | Estimated value | | Peak value | | | |
|---|---|---|---|---|---|---|---|---|
| | Global | Local | Global | Local | Global | | Local | |
| | | | | | RotScl | Transl | RotScl | Transl |
| Translation | 3 | 2 | 3 | 2 | 0.1786 | 0.5402 | 0.3572 | 0.5599 |
| Rotation | 16.85° | 11.46° | 16.87° | 11.25° | | | | |
| Scale | 1.103 | 1.1 | 1.103 | 1.093 | | | | |

Tab. 6: Estimation of motion between Fig. 12 (current frame) and Fig. 14 (previous frame)

Fig. 16

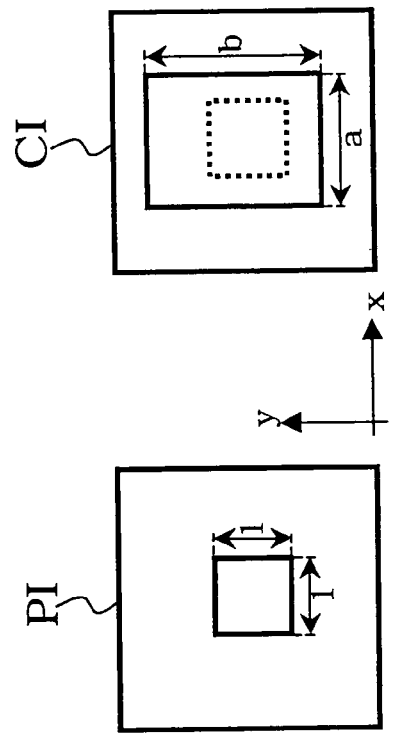
Fig. 19 Scaling
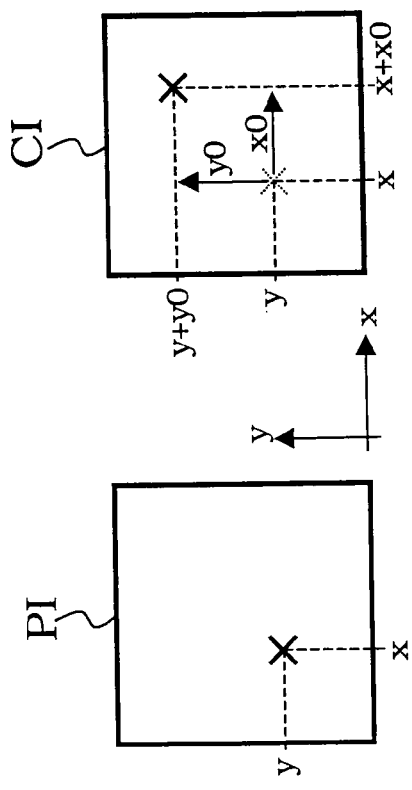
Fig. 17 Translation
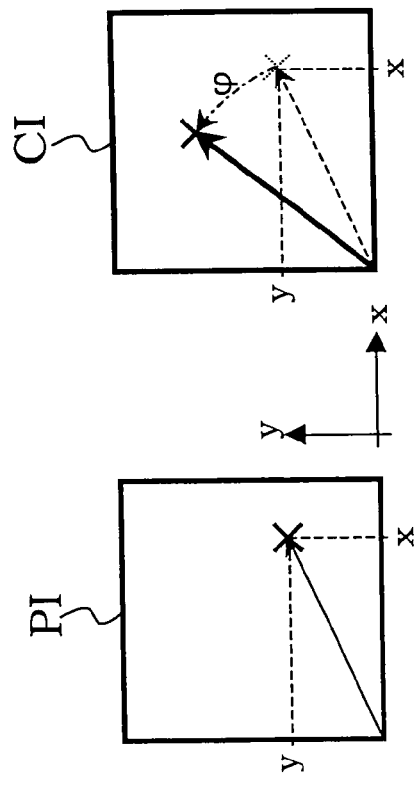
Fig. 18 Rotation

METHOD FOR MOTION ESTIMATION

The present invention relates to a method for motion estimation of sequences of images. More particular, the present invention relates to methods for global and local motion estimation for translation, rotation, and/or scaling, in particular in video scenes or video sequences.

For certain technical applications in the field of analyzing visual data and in particular in the field of analyzing video scenes or sequences of images or pictures, processes of motion estimation are involved in order to derive parameters for certain types of motion, e. g. translation, rotation and/or scaling in a global and/or in a local manner.

However, conventional processes of motion estimation in the area of video signal processing or image or picture processing are not capable of distinguishing between global and local motion and/or between the different types of motion as being translation, rotation and/or scaling.

It is therefore an object underlying the present invention to provide a method for motion estimation of sequences of images which can estimate motion parameters describing motion aspects between consecutive frames in a comparable easy, reliable and fast approach.

The object is achieved by a method of motion estimation of sequences of images according to one example of the invention. The object is further achieved by a system or an apparatus for motion estimation, by a computer program product, as well as by a computer-readable storage medium according to other examples of the invention.

According to the present invention a method for motion estimation of sequences of frames, pictures or images is proposed wherein for consecutive frames f1, f2 of a sequence of pictures, images and/or frames respective corresponding consecutive Fourier transformed frames F1, F2 are determined and wherein motion parameters for—in particular global and/or local—translation, rotation and/or scaling are derived or derivable based on a phase relationship between said respective corresponding consecutive Fourier transformed frames F1, F2.

It is therefore a basic aspect of the present invention to base a method for motion estimation of sequences of frames, pictures or images with respect to translation, rotation and/or scaling on a phase relationship between consecutive Fourier transformed frames F1, F2 with respect to respective corresponding frames f1, f2.

Preferably, said motion parameters are derived or derivable essentially based on translational, rotational and/or scaling properties of the Fourier transformation.

In the presence of a pure—in particular global and/or local—spatial translation between two frames—in particular according to $$f2(x,y) = f1(x-x0, y-y0) \quad (1.1)$$

with f1, f2 denoting the frames, with x, y denoting the spatial coordinates or pixel coordinates within the frames f1, f2, and with x0, y0 describing spatial translational parameters along the x direction and the y direction, respectively, a process (I) of estimating the translational parameters x0, y0 may be performed, wherein said process (I) of estimating the translational parameters x0, y0 may comprise:

a step of determining values Z1, Z2 of a cross power spectrum $Z(\overset{..}{,})$ for respective corresponding consecutive Fourier transformed frames F1, F2 with respect to two values v1, u1; v2, u2 for the respective frequency variables u, v, in particular according to the following formula (A)

$$Z1 := Z(u1, v1) \text{ and } Z2 := Z(u2, v1), \quad (A)$$

with $Z(\overset{..}{,})$ denoting the cross power spectrum function, with Z1, Z2 denoting the values of the cross power spectrum $Z(\overset{..}{,})$, and with v1, u1 and v2, u2 denoting first and second values for the respective frequency variables u, v, a step of determining phase values $\phi 1$, $\phi 2$ for the respective cross power spectrum values Z1, Z2, in particular according to the following formula (B)

$$\phi 1 := arg(Z(u1,v1)/2\pi) \text{ and } \phi 2 := arg(Z(u2,v2)/2\pi), \quad (B)$$

with $\phi 1$, $\phi 2$ denoting the respective phase values and with arg(·) denoting the argument function providing the phase value of any complex number, and a step of determining translational parameters x0, y0, in particular according to the following formulas (C1) and (C2):

$$y0 = \frac{u1 \cdot \varphi 2 - u2 \cdot \varphi 1}{u1 \cdot v2 - u2 \cdot v1} \quad (C1)$$

and $$x0 = \frac{\varphi 2}{u2} - \frac{v2}{u2} \cdot \frac{u1 \cdot \varphi 2 - u2 \cdot \varphi 1}{u1 \cdot v2 - u2 \cdot v1}. \quad (C2)$$

In this case each value Z of the cross power spectrum $Z(\overset{..}{,})$ of two functions F1 and F2 for two frequency coordinates u, v may be defined by a process (II) according to the following formula (D):

$$Z(u, v) := \frac{F1(u, v) \cdot F2^*(u, v)}{|F1(u, v) \cdot F2^*(u, v)|}, \quad (D)$$

with F1, F2 denoting the two respective functions, with u, v denoting the two respective two frequency coordinates, with |·| denoting the process of taking the absolute value, and with * denoting the process of taking the conjugate complex value.

Alternatively or additionally, the parameters x0 and z0 may be determined from the following circumstances:

The cross power spectrum $Z(\overset{..}{,})$ of F1 and F2 gives e.g.

$$Z(u,v) = \exp(j \cdot 2 \cdot \pi \cdot (u \cdot x0 + v \cdot y0)).$$

If one generates the inverse Fourier transform $z(\overset{..}{,})$ of this expression for $Z(\overset{..}{,})$ one obtains $$z(x,y) = dirac(x-x0, y-y0),$$

with the definition of the Dirac function:

$$dirac(a, b) := \begin{cases} 1 & \text{if } (a = 0) \wedge (b = 0) \\ 0 & \text{otherwise} \end{cases}.$$

In this way, one can derive the values for x0 and y0.

In the presence of—in particular global and/or local—translation and scaling and in the absence of—in particular global—rotation, in particular according to the following relation (2.1.1) between consecutive frames f1, f2

$$f2(x,y)=f1(a \cdot x-x0, b \cdot y-y0), \quad (2.1.1)$$

with f1, f2 denoting the frames, with x, y denoting the spatial coordinates or pixel coordinates within the frames f1, f2, with x0, y0 describing spatial translational parameters along the x direction and along the y direction, respectively, and with a, b describing the spatial scaling parameters or scaling factors along the x direction and along the y direction, respectively, a process (III) of estimating said scaling parameters a, b may be performed, wherein said process (III) of estimating said scaling parameters a, b may comprise:

a step of determining values for—in particular global—pseudo translational parameters c, d by applying said process (I) to respective magnitude functions M1, M2 for the respective corresponding consecutive Fourier transformed frames F1, F2, in particular based on logarithmic frequency variables û, v̂, in particular according to the following formula (E)

$$\hat{u}=\log(u) \text{ and } \hat{v}=\log(v), \quad (E)$$

instead of applying said process (I) to said respective corresponding consecutive Fourier transformed frames F1, F2 directly and a step of determining said global scaling parameters a, b by applying an exponentiation process to said pseudo translational parameters c, d, respectively, in particular according to the following formula (F):

$$a=e^c \text{ and } b=e^d, \quad (F)$$

with c, d denoting said pseudo translational parameters, and in particular a step determining spatial translation parameters by applying phase correlation on respective scaling compensated frames or images.

In the presence of—in particular global—translation and rotation and in the absence of—in particular global—scaling between consecutive frames f1, f2, in particular according to the following relation (2.2.1):

$$f2(x,y)=f1(x \cdot \cos(\theta 0)+y \cdot \sin(\theta 0)-x0,-x \cdot \sin(\theta 0)+y \cdot \cos(\theta 0)-y0) \quad (2.2.1)$$

with f1, f2 denoting the frames, with x, y denoting the spatial coordinates or pixel coordinates within the frames f1, f2, with x0, y0 denoting spatial the translational parameters along the x direction and along the y direction, respectively, and with θ0 describing the rotational angle between the consecutive frames f1, f2, a process (IV) of estimating rotational parameters θ0 may be performed, wherein said process (IV) of estimating rotational parameters θ0 may comprise:

a step of determining values for—in particular global—pseudo translational parameters θ̂0 by applying said first process (I) to magnitude functions M1, M2 for respective corresponding consecutive Fourier transformed frames F1, F2, in particular based on polar frequency coordinates ρ, θ, in particular according to the following formula (G):

$$u=\rho \cdot \cos(\theta) \text{ and } v=\rho \cdot \sin(\theta). \quad (G)$$

with u, v denoting the frequency coordinates and with ρ, θ denoting the polar coordinates, and a step of determining said pseudo translational parameter θ̂0 as said rotational parameter θ0, and in particular a step determining spatial translation parameters x0, y0 by applying phase correlation on respective rotation compensated frames or images.

In the presence of—in particular global—translation, rotation and scaling between consecutive frames f1, f2, in particular according to the following relation (2.3.1):

$$f2(x,y)=f1(a \cdot x \cdot \cos(\theta 0)+a \cdot y \cdot \sin(\theta 0)-x0,-a \cdot x \cdot \sin(\theta 0)+a \cdot y \cdot \cos(\theta 0)-y0). \quad (2.3.1)$$

with f1, f2 denoting the frames, with x, y denoting the spatial coordinates or pixel coordinates within the frames f1, f2, with x0, y0 denoting the spatial translational parameters along the x direction and along the y direction, respectively, with a describing the spatial scaling parameter or scaling factor along the x direction and along the y direction, and with θ0 describing the rotational angle or parameters between the consecutive frames f1, f2, a process (V) of estimating rotational parameters θ0 may be performed, wherein said process (V) of estimating rotational parameters θ0 may comprise:

a step of determining values for—in particular global—first and second pseudo translational parameters θ̂0, n by applying said first process (I) to magnitude functions M1, M2 for respective corresponding consecutive Fourier transformed frames F1, F2, in particular based on logarithmic polar frequency coordinates m, n, in particular according to the following formulas (H1) and (H2):

$$u=\rho \cdot \cos(\theta), v=\rho \cdot \sin(\theta), \quad (H1)$$

and $$m=\log(\rho), n=\log(a), \quad (H2)$$

with u, v denoting the frequency coordinates, with ρ, θ denoting the polar coordinates, and with m, n denoting logarithmic polar frequency coordinates, a step of determining said first pseudo translational parameter θ̂0 as said rotational parameter θ0, a step of determining from said second pseudo translational parameter n said scaling parameter a, in particular according to the following formula (J):

$$a=e^n, \text{ and} \quad (J)$$

in particular a step of determining spatial translational parameters (x0,y0) by applying phase correlation on respective scaling compensated and/or rotation compensated frames or images.

Preferably, high pass filtering process may be involved in order to boost high frequency details of logarithmic magnitude Fourier spectra, in particular based on a transfer function which is given according to the following formula (3.1.1):

$$H(u,v)=[1-\cos(\pi \cdot u) \cdot \cos(\rho \cdot v)] \cdot [2-\cos(\pi \cdot u) \cdot \cos(\pi \cdot v)], \quad (3.1.1)$$

wherein $-0.5 \leq u, v \leq +0.5$.

It is of particular advantage to alternatively or additionally perform before applying a Fourier transform a process of windowing with a raised cosine window function is applied, in particular with respect to the frames f1, f2.

The frames f1, f2 or images/pictures may be processed based on blocks thereof, i.e. in a block wise manner.

The size of the blocks may be set according to the motion present in the signal, frames or images, e. g. to 64×64 pixels.

Additionally or alternatively, a process of zero padding may be applied, in particular on all sides and further in particular in order to make the dimensions of input frames or pictures/images an integer multiple of the block size, e. g. of 64.

Further additionally or alternatively, a bicubic interpolation is involved in order to estimate sub-pixel values from an original frame or image/picture.

For a Cartesian to logarithmic polar coordinate transformation only valid values for the radius coordinate ρ may be chosen with $0 \leq \theta \leq 2\pi$ for the angular coordinate.

An input frame or picture/image or the blocks thereof are converted into blocks of a given block size, e. g. of 64×64 pixel blocks, in the log-polar domain or log(ρ),θ-domain.

Local translations, rotations, and/or scalings with respect to two consecutive frames or pictures/images may be handled in the same manner as global translations, rotations, and/or scalings.

Local translations, rotations, and/or scalings with respect to two consecutive frames or pictures/images may be handled after an estimation and compensation of global translations, rotations, and/or scalings.

It is a further aspect of the present invention to provide a system or apparatus for motion estimation which are adapted and/or arranged and which comprise means for carrying out the inventive method for motion estimation and the steps thereof.

Further, a computer program product is provided comprising computer program means which is adapted and/or arranged in order to perform the inventive method for motion estimation and the steps thereof.

Additionally, a computer readable storage medium is provided comprising the inventive computer program product.

These and further aspects of the present invention will be further discussed in the following:

Introduction:

The present invention relates in particular to global motion estimation for translation, rotation, and/or scaling in video scenes and further in particular to global and local motion estimation for translation, rotation, and/or scaling in Video Scenes.

On the one hand, conventional motion estimators in the area of video signal processing are only capable of tracing translatory or translational motion. The presented approach however can estimate the motion in case of translation, rotation, and/or scaling. The approach can be used to trace the global motion in video scenes of a given video sequence.

The presented motion estimation technique is FFT-based resulting in far superior estimation results in case of translatory motion when compared with traditional motion estimators.

The presented approach however can inter alia estimate the motion in case of translation, rotation, and/or scaling. The approach can be used to trace the global and local motion in video scenes of a given video sequence.

Prior Art:

Phase Correlation based Motion Estimation technique was proposed in "Television motion measurement for DATV and other applications", G. A. Thomas, BBC Research Department Report, 1987. This FFT based technique uses the property of Fourier transform which states that the translational movement in the spatial domain corresponds to the phase shift in the frequency domain, therefore the Phase Correlation method that is a block based motion estimation method is used to estimate the translational motion between the two fields directly from their phases.

The phase correlation based motion estimation technique consists of two steps:

In the first step, the input picture is divided into blocks of fairly large size (for instance 64 by 64 pixels). Then the Two-Dimensional Discrete Fourier Transform (2D-DFT) of each block in the input picture frames are taken. The 2D-DFT of the current frame is then multiplied with the conjugate complex of the 2D-DFT of the previous frame. The magnitude is normalized by dividing this product by the absolute value of the product of the two 2D-DFT. The Correlation Surface for each block is then obtained by taking the inverse 2D Fourier transform of the above product. The correlation surface consists of only the real values. The positions of the dominant peaks in the correlation surface that indicates the motion of the objects are then located. Several trial or candidate motion vectors for each block are obtained in this way. This step is referred to as the phase correlation stage.

In the second step, each block of the current picture is shifted by the amount of each trial vector and it is compared with the block of the previous picture in terms of its luminance and modulus of the luminance difference is calculated in this way. An error surface is obtained for each block for every candidate vector that will show that how well the vector matches with different area of the picture.

The vector that gives the smallest error for each area of the picture is finally assigned to that area of the picture. This step is referred to as the image correlation or vector assignment stage.

The motion estimation algorithms utilized within Sony are based on block-matching. This technique is widely used in the video processing domain. It has reached a mature state over the years However, the approach has fundamental limitations that can be overcome by the proposed invention. The fundamental difference between block-based motion estimation and phase correlation-based motion estimation is that the first technique is processing a given signal in the spatial domain while the second technique is processing the signal in the frequency domain.

Furthermore, block-based motion estimators do not distinguish between global and local motion. The presented approach is used to detect the global motion in video scenes allowing the accuracy of a subsequent local motion estimation to be improved.

Problem:

Existing phase correlation motion estimation methods measure translation motion only when no scaling or rotation is present in the current frame. However, real picture sequence may contains zooming and/or rotation of the picture. The existing algorithms fails completely to estimate translation motion under these conditions.

An extension to the existing method is being proposed to estimate translation as well as scaling and rotation. Three modifications to the existing Phase Correlation method are used which will solve the following problems:

1. estimation of translation and rotation in the absence of scale change, 2. estimation of translation and scaling in the absence of rotation, and 3. joint measurement of rotation, scaling and translation.

Solution:

In the following processes for global (A) and for local (B) motion estimation are discussed separately.

A. Global Motion Estimation

A.1. Introduction

The motion estimation technique proposed in this invention uses a Fourier domain approach in order to estimate translation, rotation and scaling by exploiting Fourier translation, rotation and scaling properties.

Let $f1(x,y)$ and $f2(x,y)$ denote a previous and a current frame in a given input picture sequence and let x and y represent respective spatial x and y coordinates, respectively. Therefore, x and y represent pixel coordinates or positions within the given frames f1 and f2.

Further, let F1(u,v) and F2(u,v) be the corresponding Fourier transforms of f1 and f2 and let u and v represent the frequency domain coordinates.

Now assume a spatial displacement or shift about x0 in the x direction and y0 about the y direction. If an input frame is shifted by such an amount of x0, y0 with respect to the previous frame according to $$f2(x,y)=f1(x-x0,y-y0) \qquad (1.1)$$

according to the shift or displacement property of Fourier transforms the corresponding Fourier transforms F1 and F2 of the previous frame f1 and the current frame f2 fulfill $$F2(u,v)=\exp[-j \cdot 2\pi \cdot (u \cdot x0+v \cdot y0)] \cdot F1(u,v). \qquad (1.2)$$

The cross power spectrum Z(u,v) of two frames f1 and f2 is given as $$Z(u,v) = \frac{F1(u,v)F2(u,v)^*}{|F1(u,v) \cdot F2^*(u,v)^*|} = \exp[-j \cdot 2\pi \cdot (u \cdot x0+v \cdot y0)], \qquad (1.2)$$

wherein * represents the conjugate complex of the 2D-FFT. The phase of said cross power spectrum Z(u,v) gives the phase difference between the two frames F1, F2. The inverse Fourier transform of said cross power spectrum Z(u,v) leads to an impulse, as the inverse Fourier transform of a complex valued exponential function leads to a Dirac function, i. e. to an impulse. The coordinates of the respective peak or impulse yields the estimated shift. This process is called phase correlation.

A.2. Modification of Phase Correlation Motion Estimation Technique

The proposed modification will cover the following three cases

Case 1: Motion estimation in the presence of translation and scaling.

Case 2: Motion estimation in the presence of translation and rotation.

Case 3: Motion estimation in the presence of translation, rotation and scaling.

A.2.1 Motion estimation with scaling

In the absence of rotation and scaling, translation motion can be estimated using the existing phase correlation method.

However, if f2(x,y) is scaled and translated with respect to f1(x, y) then it is given as $$f2(x,y)=f1(a \cdot x-x0, b \cdot y-y0) \qquad (2.1.1)$$

where a and b are the scaling factors for the horizontal or x and vertical or y directions. Using the scaling and the shift property for Fourier transforms, F1(u, v) and F2 (u, v) are related according to $$F2(u,v) = \frac{1}{|a \cdot b|} \cdot \exp\left[-j \cdot 2\pi \cdot \left(\frac{u}{a} \cdot x0 + \frac{v}{b} \cdot y0\right)\right] \cdot F1\left(\frac{u}{a}, \frac{v}{b}\right). \qquad (2.1.2)$$

Let M1(u v) and M2(u,v) be the magnitudes of F1(u,v) and F2(u,v), respectively, then the relation $$M2(u,v) = \frac{1}{|a \cdot b|} \cdot M1\left(\frac{u}{a}, \frac{v}{b}\right). \qquad (2.1.3)$$

holds.

Now, the frequency coordinates u and v are changed to a logarithmic scale, i. e. the following substitutions are performed:

$$u \to \log(u) \text{ and } v \to \log(v). \qquad (2.1.4')$$

If the u axis and the v axis are converted to a logarithmic scale according to expression (2.1.4') then scaling will be converted to a translational motion, i.e.

$$M2(\log(u), \log(v)) = \frac{1}{|a \cdot b|} \cdot M1\left(\log\left(\frac{u}{a}\right), \log\left(\frac{v}{b}\right)\right) \qquad (2.1.4)$$

$$= \frac{1}{|a \cdot b|} \cdot M1(\log(u) - \log(a), \log(v) - \log(b)),$$

i. e. the logarithmic frequency coordinates log(u) and log(v) are shifted by the logarithmic frequency displacements log(a) and log(b), respectively.

Let x=log(u) and y=log(v) and ignoring 1/ab changes expression (2.1.4) to $$M2(x,y)=M1(x-c,y-d) \qquad (2.1.5)$$

where c=log(a) and d=log(b). Expression (2.1.5) has the same form as (1.1) and therefore c and d can be found using expressions (1.2) and (1.3) and taking the inverse Fourier Transform (see section 1). The value of the scaling factors can be found by taking the inverse logarithm of c and d:

$$a=e^c \text{ and } b=e^d, \qquad (2.1.6a, 2.1.6b)$$

where e is the base of the natural logarithm.

A.2.2 Motion Estimation with Rotation

If translation and rotation of f2(x,y) with respect to f1(x,y) are considered the relation $$f2(x,y)=f1(x \cdot \cos(\theta 0)+y \cdot \sin(\theta 0)-x0,-x \cdot \sin(\theta 0)+y \cdot \cos(\theta 0)-y0) \qquad (2.2.1)$$

holds, where θ0 is the angle of rotation. Using the shift and rotation properties of Fourier transforms F1(u v) and F2(u,v) are related according to $$F2(u,v)=\exp[-j \cdot 2\pi \cdot (u \cdot x0+v \cdot y0)] \cdot F1(u \cdot \cos(\theta 0)+v \cdot \sin(\theta 0),-u \cdot \sin(\theta 0)+v \cdot \cos(\theta 0)). \qquad (2.2.2)$$

Let M1(u,v) and M2(u,v) be the magnitudes of F1(u,v) and F2(u,v), then one has the relation:

$$M2(u,v)=M1(u \cdot \cos(\theta 0)+v \cdot \sin(\theta 0),-u \cdot \sin(\theta 0)+v \cdot \cos(\theta 0)). \qquad (2.2.3)$$

The magnitudes M1(u,v) and M2(u,v) are rotated replicas of each other and the rotational motion in the frequency domain can be estimated by using a coordinate conversion from Cartesian to polar coordinates according to $$u=\rho \cdot \cos(\theta) \text{ and } v=\rho \cdot \sin(\theta) \qquad (2.2.4')$$

which results in $$M2(\rho,\theta)=M1(\rho,\theta-\theta 0). \qquad (2.2.4)$$

The rotation angle θ0 now is a shift in the frequency domain and can be determined by using phase correlation according to section A.1.

A.2.3 Motion Estimation with Scaling and Rotation

If translation, rotation and scaling of f2(x,y) with respect to f1(x,y) are simultaneously considered the relation $$f2(x,y)=f1(a \cdot x \cdot \cos(\theta 0)+a \cdot y \cdot \sin(\theta 0)-x0,-a \cdot x \cdot \sin(\theta 0)+a \cdot y \cdot \cos(\theta 0)-y0) \qquad (2.3.1)$$

holds where θ0 is the rotation and a is the scaling factor. By using the shift, scaling and rotation properties of Fourier transforms F1(u,v) and F2(u,v) are related according to:

$$F2(u, v) = \frac{1}{|a|^2} \cdot \exp\left[-j \cdot 2\pi \cdot \left(\frac{u}{a} \cdot x0 + \frac{v}{a} \cdot y0\right)\right] \cdot \ldots \quad (2.3.2)$$
$$\ldots \cdot F1\left(\frac{u}{a} \cdot \cos(\theta 0) + \frac{v}{a} \cdot \sin(\theta 0), -\frac{u}{a} \cdot \sin(\theta 0) + \frac{v}{a} \cdot \cos(\theta 0)\right)$$

Let M1(u,v) and M2(u,v) be the magnitudes of F1(u,v) and F2(u,v). Then, M1(u,v) and M2(u,v) fulfill $$M2(u, v) = \quad (2.3.3)$$
$$\frac{1}{|a|^2} \cdot M1\left(\frac{u}{a} \cdot \cos(\theta 0) + \frac{v}{a} \cdot \sin(\theta 0), -\frac{u}{a} \cdot \sin(\theta 0) + \frac{v}{a} \cdot \cos(\theta 0)\right)$$

Performing a coordinate conversion from Cartesian to polar coordinates according to $$u = \rho \cdot \cos(\theta) \text{ and } v = \rho \cdot \sin(\theta) \quad (2.3.4')$$

yields $$M2(\rho, \theta) = \frac{1}{|a|^2} M1\left(\frac{\rho}{a}, \theta - \theta 0\right). \quad (2.3.4)$$

To convert scaling to translation the axes for ρ are changed to a logarithmic scale according to $$\rho \rightarrow \log(\rho). \quad (2.3.5')$$

It follows that $$M2(\log(\rho), \theta) = \frac{1}{|a|^2} \cdot M1\left(\log\left(\frac{\rho}{a}\right), \theta - \theta 0\right) \quad (2.3.5)$$
$$= \frac{1}{|a|^2} \cdot M1(\log(\rho) - \log(a), \theta - \theta 0),$$

is fulfilled.

Let m=log(ρ) and n=log(a). From (2.3.5) it follows that $$M2(\log(\rho), \theta) = \frac{1}{|a|^2} \cdot M1(m, \theta) \quad (2.3.6)$$
$$= M1(m - n, \theta - \theta 0),$$

is fulfilled. This can be evaluated according to section 1 in order to obtain rotational angle θ0 in the spatial domain and the scaling factor a by using phase correlation.

A.3. Simulation Model

Before presenting the software model, we will discuss some important implementation issues.

A.3.1 High Pass Filtering

A simple high pass filter is used to boost the high frequency details of the log magnitude Fourier spectra. Its transfer function is given as $$H(u,v)=[1-\cos(\pi \cdot u)\cdot\cos(\pi \cdot v)]\cdot[2-\cos(\pi \cdot u)\cdot\cos(\pi \cdot v], \quad (3.1.1)$$

where −0.5≦u,v≦+0.5.

A.3.2 Raised Cosine Windowing

The input picture portion is windowed before taking FFT with a raised cosine window that will cause the image to fade to zero at the edges. This is done to avoid sharp luminance transition at the edges of the block that results in noise due to the periodic nature of the Fourier transform.

A.3.3 Other Issues

A.3.3.1 Block Size

The input picture is divided into the blocks of 64 by 64 pixels size. Zero padding is done equally on all side to make the dimensions of input picture an integer multiple of 64.

A.3.3.2 Picture Transformation

Bicubic interpolation is used to estimate the sub pixel values from the original image. Affine transformation model is used to translate, rotate and scale the input picture.

A.3.3.3 Cartesian to Log-Polar Conversion

In Cartesian to log-polar conversion, only valid values of ρ are selected 0≦θ≦2π. The input picture block is converted into a 64 by 64 block in the log-polar domain or log(ρ),θ-domain.

A.4. Simulation Results

Figure 2:
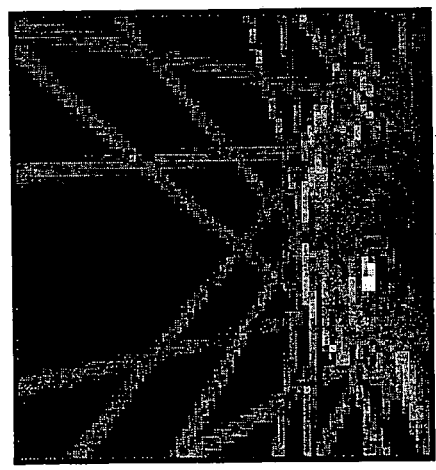

The block diagram of the simulation model that we have implemented is shown in FIG. 1. We have used different test sequences to check the performance of the motion estimation algorithm. FIG. 2 shows 64×64 current frame of the picture sequence. FIGS. 3, 4, 5 and 6 show previous frame with different known transformation parameters.

We have considered the highest peak in the correlation surface as the valid motion vector. We have applied our algorithm to estimate translation, rotation and scaling by first estimating the rotation and scaling and then applying affine transformation to the current frame and again performing the phase correlation to estimate the translation motion (see FIG. 1). Results of the estimated motion parameters are shown in table 1, 2, 3 and 4.

The slight difference in the actual and the measured value is due to non-uniformity of the scale. We have successfully measured translation (horizontal and vertical) of 21 pixels, rotation of 90° and scaling of 1.65 using this algorithm, e. g. for the block size of 64×64. The limiting factor is the loss of relevant information present in the frames if we further alter the transformation parameters. In our implementation we have used single peak approach (i.e. we have only taken first peak in the correlation surface as the valid peak). This reduces the amount of computation to estimate the motion vectors.

A.5. Conclusion

An extension to the phase correlation based motion estimation technique was presented in this report. The new technique is capable of jointly detecting translation, scaling and rotation motion (see section A.2.3). The range of translation, rotation and scaling that can be measured is also mentioned in this report (see section A.4). To increase the range of motion parameters that can be measured by our system, we have to consider more peaks in the correlation surface and then find the parameters that produces the highest peak.

Existing phase correlation motion estimation technique fails completely if scaling or rotation or both are present. Algorithm to estimate translation in the presence of scaling only (see section A.2.1) can easily be implemented by performing logarithmic transformation of both axis, however, it will be sensitive to rotation. Similarly, technique described in section A.2.2 can also be easily implemented by doing Cartesian to polar conversion, it will estimate motion in the presence of rotation only but it will also fail if scaling is present. Our algorithm provides a robust method for estimation of all three motion parameters (i.e. translation, rotation and scaling) either separately or jointly.

B Local Motion Estimation

B.1. Introduction

The motion estimation technique proposed in this invention report uses the Fourier domain approach to estimate translation, rotation and scaling by exploiting Fourier translation, rotation and scaling properties. The concept of phase correlation based motion estimation technique and its modification to estimate global translation, rotation and scaling motion is already defined as described above with respect to the estimation of global motion. An extension to the existing method is being proposed to estimate global and local translation as well as scaling and rotation.

B.2. Modification of Phase Correlation Motion Estimation Technique

The proposed modification will cover the following three cases

Case 1: Global and local motion estimation in the presence of translation and scaling.

Case 2: Global and local motion estimation in the presence of translation and rotation.

Case 3: Global and local motion estimation in the presence of translation, rotation and scaling.

B.2.1 Global and Local Motion Estimation with Scaling

An algorithm for global motion estimation with scaling as described above with respect to the estimation of global motion. In order to estimate global and local motion we propose the following method steps:

Estimate the global translation and scaling using the technique as described above with respect to the estimation of global motion.

Perform the compensation on the current frame using the estimated global translation and scaling values.

Compute the absolute difference of the globally compensated current frame and the previous frame.

Threshold the difference image to get binary image.

Use image segmentation on the difference image to find the position and size of the local objects.

Estimate the local translation and scaling of the objects using the technique as described above with respect to the estimation of global motion.

B.2.2 Global and Local Motion Estimation with Rotation

As described above with respect to the estimation of global motion an algorithm for the global motion estimation in the presence of rotation is presented. In order to estimate global and local translation and rotation motion the following method steps are proposed:

Estimate the global translation and rotation using the technique as described above with respect to the estimation of global motion.

Perform the compensation on the current frame using the estimated global translation and rotation values.

Compute the absolute difference of the globally compensated current frame and the previous frame.

Threshold the difference image to get binary image.

Use image segmentation on the difference image to find the position and size of the local objects.

Estimate the local translation and rotation of the objects using the technique as described above with respect to the estimation of global motion.

B.2.3 Global and Local Motion Estimation with Scaling and Rotation

Finally, we are considering the case of global and local translation, rotation and scaling motion estimation. Details of the method for global motion measurement can be found as described above with respect to the estimation of global motion. Here we will present an extended technique to measure local and global motion:

Estimate the global translation, rotation and scaling using the technique as described above with respect to the estimation of global motion.

Perform the compensation on the current frame using the estimated global translation, rotation and scaling values.

Compute the absolute difference of the globally compensated current frame and the previous frame.

Threshold the difference image to get binary image.

Use image segmentation on the difference image to find the position and size of the local objects.

Estimate the local translation, rotation and scaling of the local objects using the technique as described above with respect to the estimation of global motion.

B.3. Simulation Model

Figure 11:
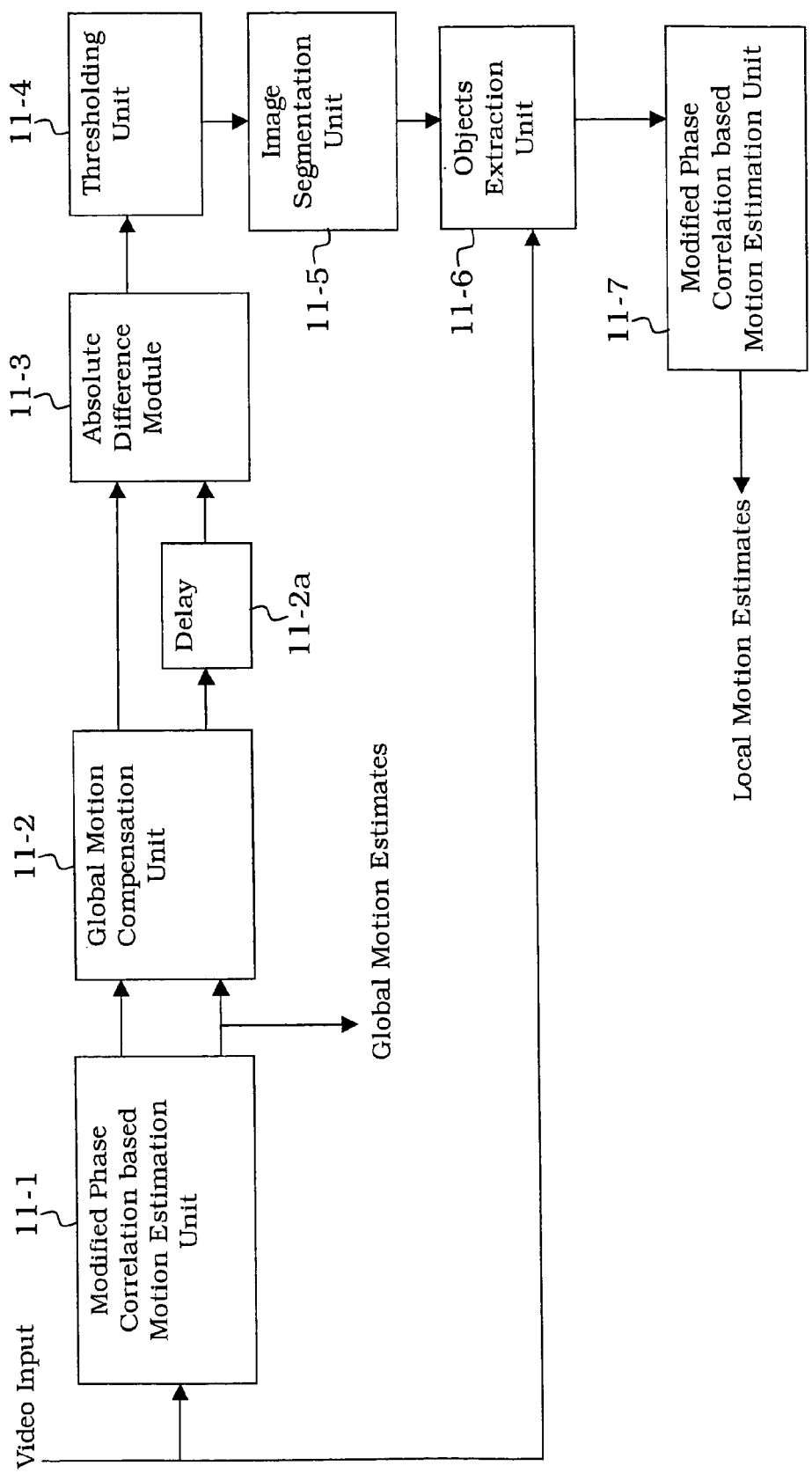

The block diagram of the simulation model for the motion estimation system described in section B.2 is shown in FIG. 11. Simulation model used for modified phase correlation based motion estimation system is explained as described above with respect to the estimation of global motion.

The input picture is divided into blocks of 128 by 128 pixels. Zero padding is applied equally on all sides to make the dimensions of the input picture an integer multiple of 128.

A bicubic interpolation is used to estimate the sub pixel values from the original image. An affine transformation model is used to translate, rotate and scale the input picture.

The delay block shifts the input picture by one frame/field period. Any suitable threshold and segmentation technique can be used to detect the position and size of the object block from the binary image. For instance, we may find threshold using the histogram and we may use binary mathematical morphology based operations for object detection.

B.4. Simulation Results

Figure 14:
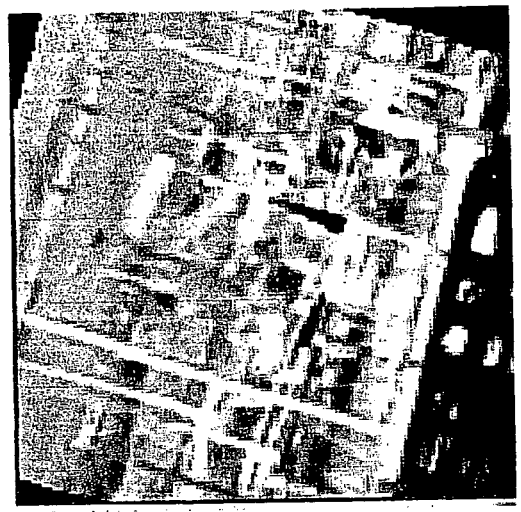
Figure 13:
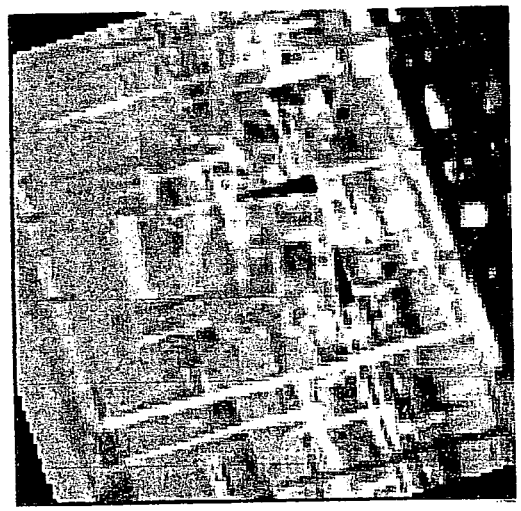
Figure 12:
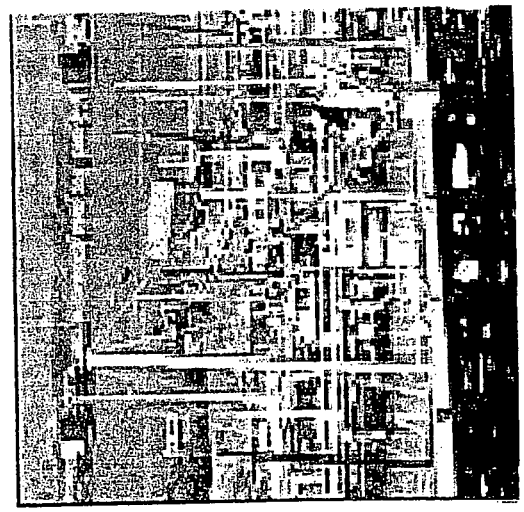

We have used different test sequences to check the performance of our motion estimation algorithm. FIG. 12 shows 128×128 current frame of the picture sequence. A 32×32 block with its center lying at the center of the 128×128 frame is considered an object. FIGS. 13 and 14 show previous frames with different known global and local transformation parameters, i.e. translation, rotation and scaling.

We have considered the highest peak in the correlation surface as the valid motion vector. We have applied our algorithm to estimate global translation, rotation and scaling by first estimating the rotation and scaling and then applying affine transformation to the current frame and again performing phase correlation to estimate the translation motion. Then we have estimated local motion after applying transformation to the current and previous frames, see FIG. 11. Results of the estimated motion parameters are shown in tables 5 and 6 shown in FIGS. 15 and 16. A negative indicates counter clockwise rotation whereas a positive sign indicates clockwise rotation. The transformation parameters are applied to the previous frames shown in FIG. 13 and in FIG. 14.

The two tables above show the actual global and local motion parameters, the measured global and local motion values using our algorithm and the peak values in the correlation surfaces. "RotScl" and "Transl" indicate peak values in the correlation surface obtained in the process of detecting "rotation scaling" and "translation" respectively. The slight difference between the actual and the measured values is due to non-uniformity of the scale. Furthermore, the difference between the actual and the estimated value for local motion is larger due to the fact that the block size is smaller block for these objects. We have successfully measured global and local translation, rotation and scaling using this algorithm.

The limiting factor is the loss of relevant information present in the frames. Also, it should be noted that local motion estimates for smaller objects cannot be obtained since the correlation is lost between the blocks and they are no more correlated in the current and the previous frames. Another important limitation is that if the number of objects is large such that they occupy a significant area then the local motion of large number of objects affects the global motion estimates. In our implementation we have used the single peak approach, i.e. we have only taken first peak in the correlation surface as the valid peak. This reduces the amount of computation required to estimate the motion vectors.

B.5. Conclusion

Existing phase correlation motion estimation techniques fail completely if scaling or rotation or both are present. The modified phase correlation based motion estimation system that was presented as described above with respect to the estimation of global motion was capable of detecting global motion. However, it fails to measure the local motion of objects.

A further extension to this phase correlation based motion estimation technique was presented in this invention report. The new technique is capable of jointly detecting global and local translation, scaling and rotation motion (see section B.2.3). Different global and local translation, rotation and scaling that are measured using this algorithm are mentioned in this report (see section B.4). To increase the range of motion parameters that can be measured by our system, we could consider more peaks in the correlation surface and then find the parameters that produce the highest peak.

The algorithm to estimate global and local translation in the presence of scaling only (see section B.2.1) and to estimate global and local translation in the presence of rotation only (see section B.2.2) can easily be implemented by changing the modified phase correlation based motion estimator as described above with respect to the estimation of global motion. However, it will be unable to jointly detect translation, rotation and scaling. Our presented algorithm provides a robust method for estimating all three types of global and local motion parameters, i.e. translation, rotation and scaling, either separately or jointly.

In the following these and further aspects of the present invention will be explained in more detail based on preferred embodiments of the present invention and by taking reference to the accompanying figures which schematically demonstrate aspects of the present invention.

FIG. 1 is a schematical block diagram describing a preferred embodiment of the inventive method for global motion estimation.

FIGS. 2-6 demonstrate by means of a sequence of images application aspects of an embodiment of the inventive method for global motion estimation.

FIGS. 7-10 summarize by means of respective tables the actual and the measured geometrical relationships between the images shown in FIGS. 2 to 6.

FIG. 11 is a schematical block diagram describing a preferred embodiment of the inventive method for global and local motion estimation.

FIGS. 12-14 demonstrate by means of a sequence of images application aspects of an embodiment of the inventive method for global and local motion estimation.

FIGS. 15, 16 summarize by means of respective tables the actual and the measured geometrical relationships between the images shown in FIGS. 2 to 6.

FIGS. 17-19 demonstrate by means of graphical representations the definition of certain geometrical aspects between consecutive frames or images.

Figure 20:
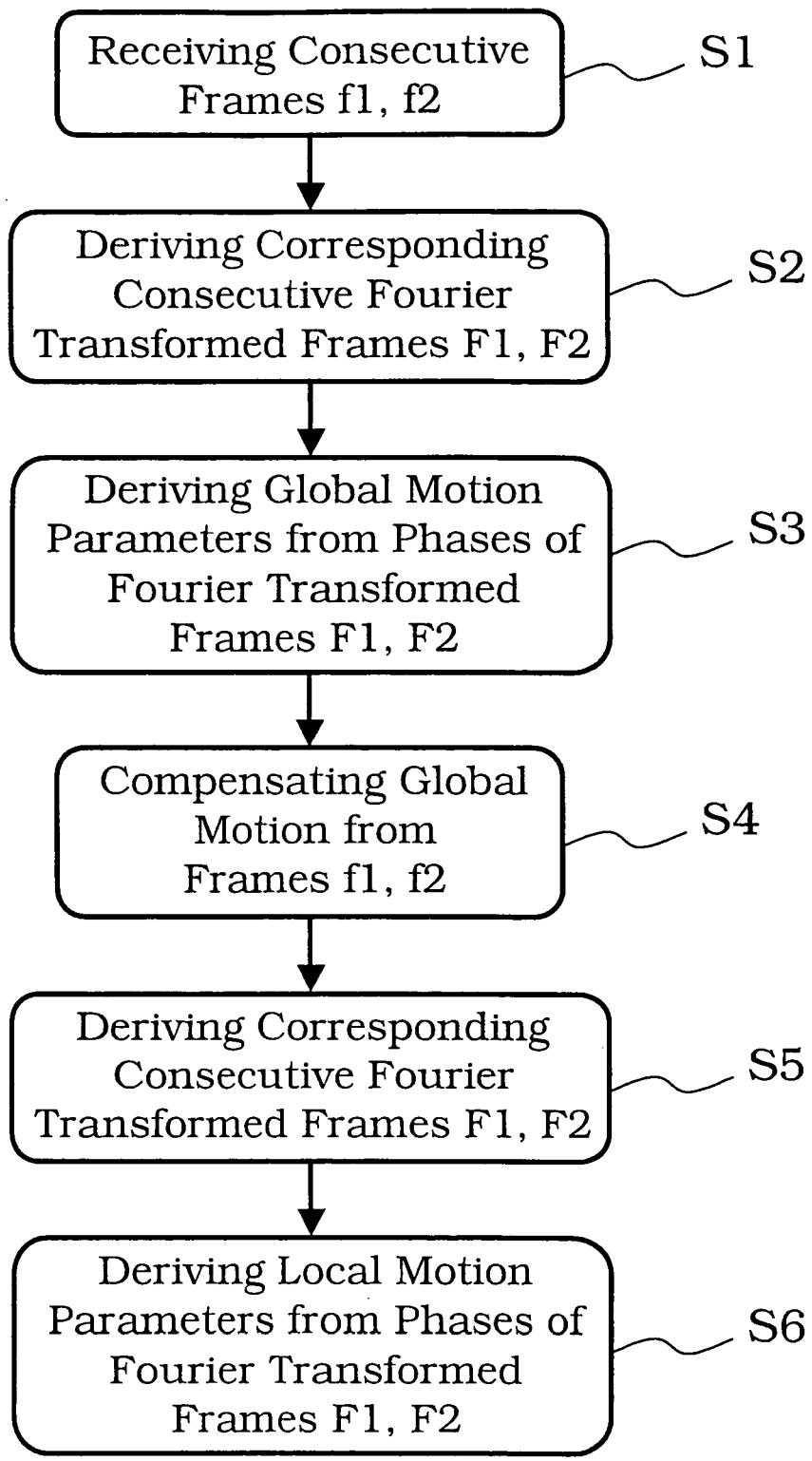

FIG. 20 is a schematical block diagram elucidating further general aspects of the inventive method for motion estimation.

In the following structural and/or functional elements which are comparable, similar or equivalent with respect to each other will be denoted by identical reference symbols. Not in each case of their occurrence a detailed description will be repeated.

Before going into detail, reference is taken to FIG. 20 which demonstrates by means of a schematical block diagram in a broader sense basic aspects of the inventive method for motion estimation.

FIG. 20 gives a rough sketch of some basic aspects of the present invention. In a first process S1 video input data and in particular consecutive frames f1, f2 are received from which corresponding consecutive Fourier transformed frames F1, F2 are derived in a following process S2. Based on phase relationships between said corresponding consecutive Fourier transformed frames F1, F2 global motion parameters are derived in a next process S3 based on which the global motion contained in consecutive frames f1, f2 is removed or compensated in process S4 so that only local motion aspects remain in thereby obtained global motion compensated consecutive frames f1', f2'. Again, consecutive Fourier transformed frames F1', F2' are derived in a further process S5 which correspond to said global motion compensated consecutive frames f1', f2'. Based on phase relationships between said consecutive Fourier transformed frames F1', F2' corresponding to said global motion compensated consecutive frames f1', f2' local motion parameters are derived in a next process S6. Thereby, according to the present invention global and local motion parameters with respect to translation, rotation and scaling can be determined in an easy, reliable and consistent manner and essentially based on translation, rotation and scaling properties of the Fourier transforming process only.

FIG. 1 is a schematical block diagram describing some aspects of a preferred embodiment of the inventive method for motion estimation. The method described in FIG. 1 consists of a sequence of procedural steps 1-1 to 1-16.

In a first step 1-1 video input data in the form of a sequence of frames, images, and/or pictures is supplied to a process of block based cosine windowing. The results of the windowed data are provided to a following step 1-2 of block based logarithmic magnitude fast Fourier transformation.

The Fourier transformed data are supplied to a following step 1-3 of block based high pass filtering.

The output data of step 1-3 are fed into a process 1-4 of block based logarithmic polar conversion.

The results of step 1-4 are again block based raised cosine windowed in a following step 1-5.

In the following step 1-6 the output data of process 1-5 are block based fast Fourier transformed. The output data are twice supplied to a following step 1-7 of the determination of cross power spectral data, i.e. as the original output data from step 1-6 and as the output data of step 1-6 to which a delay process 1-6a has been supplied.

The cross power spectral data are supplied to a following step 1-8 of block based inverse fast Fourier transformation.

In the following step 1-9 the output data of step 1-8 are supplied to a block based peak detection process, from the output of which a rotational angle and a scaling factor can be derived.

Based on the rotational angle and the scaling factor and the original video input data a block based transformation is applied thereto in step 1-10.

The output of step 1-10 is fed into a block based raised cosine windowing process of step 1-11.

Then, a block based fast Fourier transformation follows in step 1-12.

Again, a cross power spectral analysis is applied in step 1-14 to the block based fast Fourier transformed output data of step 1-10, i. e. to the original output data of step 1-12 and to the output data of step 1-12 to which the delay process according to step 1-12a has been applied.

The output of the cross power spectral data of step 1-14 are fed into a process of block based inverse fast Fourier transformation of step 1-15. The output data of step 1-15 are fed into a process of block based peak detection according to step 1-16 from which translational parameters can be obtained.

FIG. 1 also describes a preferred embodiment of an apparatus for carrying out the inventive method. It can inter alia be applied to the application areas of camera shaking/moving compensation, source coding for video, and video rate and scan conversion.

Figure 3:
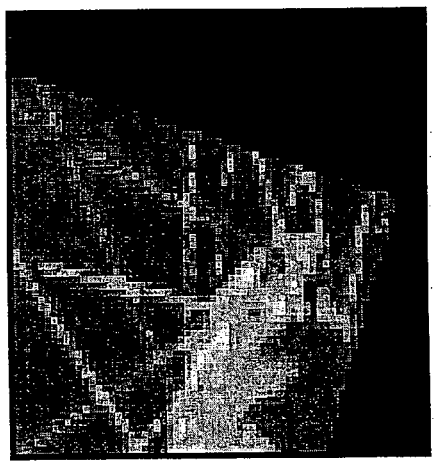

FIGS. 2 to 6 demonstrate by means of photograph frames pictures, and/or images which have certain geometrical relationships with respect to each other. FIG. 2 may be referred to as a current frame of a certain object without any rotation, scaling, and/or translation. With respect to FIG. 2 FIG. 3 is scaled with a factor of 1.25, rotated about 17.2°, and horizontally and vertically translated by 21 pixels.

Figure 4:

With respect to FIG. 2 FIG. 4 is scaled by a factor of about 1.65, rotated by an angle of 7.2°, and horizontally and vertically translated by 5 pixels.

Figure 5:
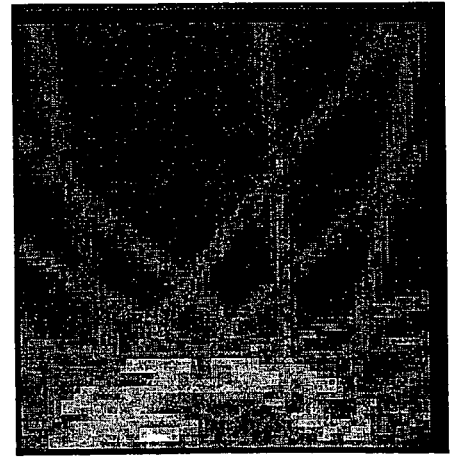

With respect to FIG. 2 FIG. 5 is scaled with a scaling factor of about 1.1, rotated by an angle of 90°, and horizontally and vertically translated by 5 pixels.

Figure 6:

With respect to FIG. 2 FIG. 6 is scaled by a scaling factor of about 1.6, rotated by an angle of 28.6°, and horizontally and vertically translated by 21 pixels.

FIGS. 7 to 10 show by means of tables 1 to 4 calculation results for the translational, rotational, and scaling parameters of FIGS. 3, 4, 5 and 6, respectively, in each case with respect to FIG. 2 which is referred to as a current frame. That means that the parameter shown in FIGS. 7 to 10 and the respective tables 1 to 4 have to be compared to the parameters which have been used for translation, rotation and scaling in order to derive from FIG. 2 as a current frame the previous frames shown in FIGS. 3, 4, 5 and 5, respectively.

FIG. 11 is a schematical block diagram which elucidates another preferred embodiment of the present inventive method for motion estimation and in particular when distinguishing between global and local motion estimation.

According to FIG. 11 from a provided video input in a first process 11-1 global estimation parameters are derived as described above by using the process of modified phase correlation-based motion estimation.

The output data of the process 11-1 are fed into a further process 11-2 for global motion compensation together with a video input from which the global motion between consecutive frames have to be removed.

The result from the global motion compensation according to process 11-2 is fed into a following process 11-3 of deriving an absolute difference between the consecutive frames, i.e. the compensated video input is provided as original data and after application of a delay process 11-2a in delayed form in order to compare consecutive frames of the globally compensated video input.

The output data after building the absolute difference between consecutive frames of step 11-3 is fed into a following process 11-4 evaluating threshold properties.

The threshold process data of step or process 11-4 are supplied to a following process 11-5 of image sequentation. The output of process 11-2 is fed into an object extraction process 11-6.

Then, based on a process modified phase correlation-based motion estimation local motion estimates are derived in order to present as a result local parameters for local translation, rotation, and/or scaling.

FIGS. 12 to 14 show frames to which certain geometrical processes have been applied in order to test the inventive method for motion estimation. In the sequence of FIGS. 12 to 14 FIG. 12 serves as a current frame whereas FIGS. 13 and 14 serve as previous frames which are globally and locally scaled, rotated and/or translated with respect to the frame shown in FIG. 12.

Tables 5 and 6 as shown in FIGS. 15 and 16 demonstrate the numerical results which are obtained by applying the inventive method for motion estimation with respect to the pairs of frames of FIGS. 12 and 13 and 12 and 14, respectively.

FIGS. 17, 18 and 19 give a rough definition of the geometrical parameters, i. e. of the translational parameters, of the rotational parameters and of the scaling parameters which are used to describe the action of the application of the inventive method for estimating motion between consecutive frames.

CITED REFERENCES

[1] G. A. Thomas, "Television Motion Measurement for DATV and other Applications", BBC Research Department, Research Report 1987/11.
[2] B. Reddy and B. Chatterji, "An FFT-based Technique for Translation, Rotation and Scale-invariant Image Registration", IEEE Trans. on Image Processing, 5:8, pp 1266-1271, 1996.
[3] L. Hill and T. Vlachos, "On the Estimation of Global Motion using Phase Correlation for Broadcast Applications" IEEE International Conference on Image Processing and it's Applications (IPA 99), pp 721-725, 1999.

REFERENCE SYMBOLS a scaling parameter along x direction
b scaling parameter along y direction
CI current image/frame
f1 first or previous image/frame
F1 Fourier transformed first or previous image/frame
f2 second or current image/frame
F2 Fourier transformed second or current image/frame
PI previous image/frame
x0 translational parameter in x direction
y0 translational parameter in y direction
φ0 rotational parameter

The invention claimed is:

1. A method for a motion estimation of sequences of images, the method comprising:
 determining, for consecutive frames (f1, f2) of a sequence of images/frames, respective corresponding consecutive Fourier transformed frames (F1, F2); and
 deriving motion parameters for global and local translation, rotation and/or scaling based on a phase relationship between said respective corresponding consecutive Fourier transformed frames (F1, F2), wherein local translations, rotations, and/or scalings with respect to two consecutive frames or pictures/images are handled after an estimation and a compensation of global translations, rotations, and/or scalings.

2. The method according to claim 1, wherein said motion parameters are derived or derivable essentially based on translational, rotational and/or scaling properties of the Fourier transformation.

3. The method according to claim 1, wherein
in the presence of a global and/or local spatial translation between two frames (f1, f2), according to $$f2(x,y)=f1(x-x0,y-y0)$$

with f1, f2 denoting the frames, with x, y denoting spatial coordinates or pixel coordinates within the frames (f1, f2), and with x0, y0 describing spatial translational parameters along an x direction and a y direction, respectively, a process (I) of estimating the translational parameters (x0, y0) is performed, and
said process (I) of estimating said translational parameters (x0, y0) comprises:
determining values (Z1, Z2) of a cross power spectrum (Z(·,·)) for respective corresponding consecutive Fourier transformed frames (F1, F2) with respect to two values (v1, u1; v2, u2) for respective frequency coordinates (u, v), according to the following formula $$Z1:=Z(u1,v1) \text{ and } Z2:=Z(u2,v1),$$

with Z(·,·) denoting the cross power spectrum function, with Z1, Z2 denoting the values of the cross power spectrum (Z(·,·)), and with v1, u1 and v2, u2 denoting first and second values for the respective frequency coordinates (u, v),
determining phase values (φ1, φ2) for the respective cross power spectrum values (Z1, Z2), according to the following formula $$\varphi 1:=arg(Z(u1,v1)/2\pi) \text{ and } \varphi 2:=arg(Z(u2,v2)/2\pi),$$

with φ1, φ2 denoting the respective phase values and with arg(·) denoting the argument function providing a phase value of any complex number, and
determining the translational parameters (x0, y0), according to the following formulas:

$$y0 = \frac{u1 \cdot \varphi 2 - u2 \cdot \varphi 1}{u1 \cdot v2 - u2 \cdot v1} \text{ and}$$

$$x0 = \frac{\varphi 2}{u2} - \frac{v2}{u2} \cdot \frac{u1 \cdot \varphi 2 - u2 \cdot \varphi 1}{u1 \cdot v2 - u2 \cdot v1}.$$

4. The method according to claim 3, wherein each value (Z) of the cross power spectrum (Z(·,·)) of two functions (F1, F2) for two frequency coordinates (u, v) is defined by a process according to the following formula:

$$Z(u, v) := \frac{F1(u, v) \cdot F2^*(u, v)}{|F1(u, v) \cdot F2^*(u, v)|},$$

with F1, F2 denoting the two respective functions, with u, v denoting the two respective two frequency coordinates, with |·| denoting a process of taking an absolute value, and with * denoting a process of taking a conjugate complex value.

5. The method according to claim 3, wherein
in the presence of a global and/or local translation and scaling and in an absence of a global and/or local rotation, according to the following relation between the consecutive frames (f1, f2)

$$f2(x,y)=f1(a \cdot x-x0, b \cdot y-y0),$$

with f1, f2 denoting the frames, with x, y denoting the spatial coordinates or pixel coordinates within the frames (f1, f2), with x0, y0 describing the spatial translational parameters along the x direction and along the y direction, respectively, and with a, b describing spatial scaling parameters or scaling factors along the x direction and along the y direction, respectively, a process of estimating said scaling parameters (a, b) is performed, and
said process of estimating said scaling parameters (a, b) comprises:
determining values for global pseudo translational parameters (c, d) by applying said process (I) to respective magnitude functions for the respective corresponding consecutive Fourier transformed frames (F1, F2), based on logarithmic frequency variables (û, v̂), according to the following formula $$\hat{u}=\log(u) \text{ and } \hat{v}=\log(v),$$

instead of applying said process (I) to said respective corresponding consecutive Fourier transformed frames (F1, F2) directly,
determining said global scaling parameters (a, b) by applying an exponentiation process to said pseudo translational parameters (c, d), respectively, according to the following formula:

$$a=e^c \text{ and } b=e^d,$$

with c, d denoting said pseudo translational parameters, and
determining spatial translation parameters (x0, y0) by applying a phase correlation on respective scaling compensated frames or images.

6. The method according to claim 3, wherein in the presence of a global translation and rotation and in an absence of a global scaling between the consecutive frames (f1, f2), according to the following relation:

$$f2(x,y)=f1(x \cdot \cos(\theta 0)+y \cdot \sin(\theta 0)-x0, -x \cdot \sin(\theta 0)+y \cdot \cos(\theta 0)-y0)$$

with f1, f2 denoting the frames, with x, y denoting the spatial coordinates or pixel coordinates within the frames (f1, f2), with x0, y0 denoting the spatial translational parameters along the x direction and along the y direction, respectively, and with θ0 describing a rotational angle between the consecutive frames (f1, f2), a process of estimating rotational parameters (θ0) is performed, and
said process of estimating rotational parameters (θ0) comprises:
determining values for global pseudo translational parameters (θ̂0) by applying said process (I) to magnitude functions for the respective corresponding consecutive Fourier transformed frames (F1, F2), based on polar frequency coordinates (ρ, θ), according to the following formula:

$$u=\rho \cdot \cos(\theta) \text{ and } v=\rho \cdot \sin(\theta),$$

with u, v denoting the frequency coordinates and with ρ, θ denoting the polar coordinates,
determining said pseudo translational parameter (θ̂0) as said rotational parameter (θ0), and
determining spatial translation parameters (x0, y0) by applying a phase correlation on respective rotation compensated frames or images.

7. The method according to claim 3, wherein
in the presence of a global translation, rotation and scaling between consecutive frames (f1, f2), according to the following relation:

$$f2(x,y)=f1(a \cdot x \cos(\theta 0)+a \cdot y \cdot \sin(\theta 0)-x0, -a \cdot x \cdot \sin(\theta 0)+ a \cdot y \cdot \cos(\theta 0)-y0)$$

with f1, f2 denoting the frames, with x, y denoting the spatial coordinates or pixel coordinates within the frames (f1, f2), with x0, y0 denoting the spatial translational parameters along the x direction and along the y direction, respectively, with a describing a spatial scaling parameter or scaling factor along the x direction and along the y direction, and with θ0 describing a rotational angle or parameters between the consecutive frames (f1, f2), a process of estimating rotational parameters (θ0) is performed, and said process of estimating rotational parameters (θ0) comprises:

determining values for global first and second pseudo translational parameters ($\hat{\theta}0$, n) by applying said process (I) to magnitude functions for the respective corresponding consecutive Fourier transformed frames (F1, F2), based on logarithmic polar frequency coordinates (m, n), according to the following formulas:

$u = \rho \cdot \cos(\theta)$, $v = \rho \cdot \sin(\theta)$, and $m = \log(\rho)$, $n = \log(a)$, with u, v denoting the frequency coordinates, with ρ, θ denoting polar coordinates, and with m, n denoting the logarithmic polar frequency coordinates, determining said first pseudo translational parameter ($\hat{\theta}0$) as said rotational parameter (θ0), determining from said second pseudo translational parameter (n) said scaling parameter (a), according to the following formula:

$a = e^n$, and determining spatial translational parameters (x0,y0) by applying a phase correlation on respective scaling compensated and/or rotation compensated frames or images.

8. The method according to claim 1, wherein a high pass filtering process is involved in order to boost high frequency details of logarithmic magnitude Fourier spectra, based on a transfer function which is given according to the following formula:

$H(u,v) = [1 - \cos(\pi \cdot u) \cdot \cos(\pi \cdot v)] \cdot [2 - \cos(\pi \cdot u) \cdot \cos(\pi v)]$, wherein $-0.5 \leq u, v \leq 0.5$.

9. The method according to claim 1, wherein before applying a Fourier transform a process of windowing with a raised cosine window function is applied, with respect to the frames (f1, f2).

10. The method according to claim 1, wherein the frames (f1, f2) or images/pictures are processed based on blocks thereof.

11. The method according claim 10, wherein a size of the blocks is set according to a motion present in a signal, frames or images.

12. The method according to claim 10, wherein a process of zero padding is applied, on all sides and in order to make dimensions of input frames or pictures/images an integer multiple of the block size.

13. The method according to claim 1, wherein a bicubic interpolation is involved in order to estimate sub-pixel values from an original frame or image/picture.

14. The method according to claim 1, wherein for a Cartesian to logarithmic polar coordinate transformation only valid values for a radius coordinate are chosen with $0 \leq \theta \leq 2\pi$ for an angular coordinate.

15. The method according to claim 1, wherein an input frame or picture/image or blocks thereof are converted into blocks of a given block size in a log-polar domain or a log (ρ),θ-domain.

16. The method according to claim 1, wherein the local translations, rotations, and/or scalings with respect to the two consecutive frames or pictures/images are handled in a same manner as the global translations, rotations, and/or scalings.

17. A system or an apparatus for a motion estimation, the system or apparatus comprising:

means for determining for consecutive frames of a sequence of images/frames respective corresponding consecutive Fourier transformed frames; and means for deriving motion parameters for global and local translation, rotation and/or scaling based on a phase relationship between said respective corresponding consecutive Fourier transformed frames, wherein local translations, rotations, and/or scalings with respect to two consecutive frames or pictures/images are handled after an estimation and a compensation of global translations, rotations, and/or scalings.

18. A computer-readable non-transitory storage medium comprising a computer program product that comprises a computer program, which when executed by a processing unit, causes the processing unit to perform the method for motion estimation according to claim 1.

* * * * *